Figure 1:
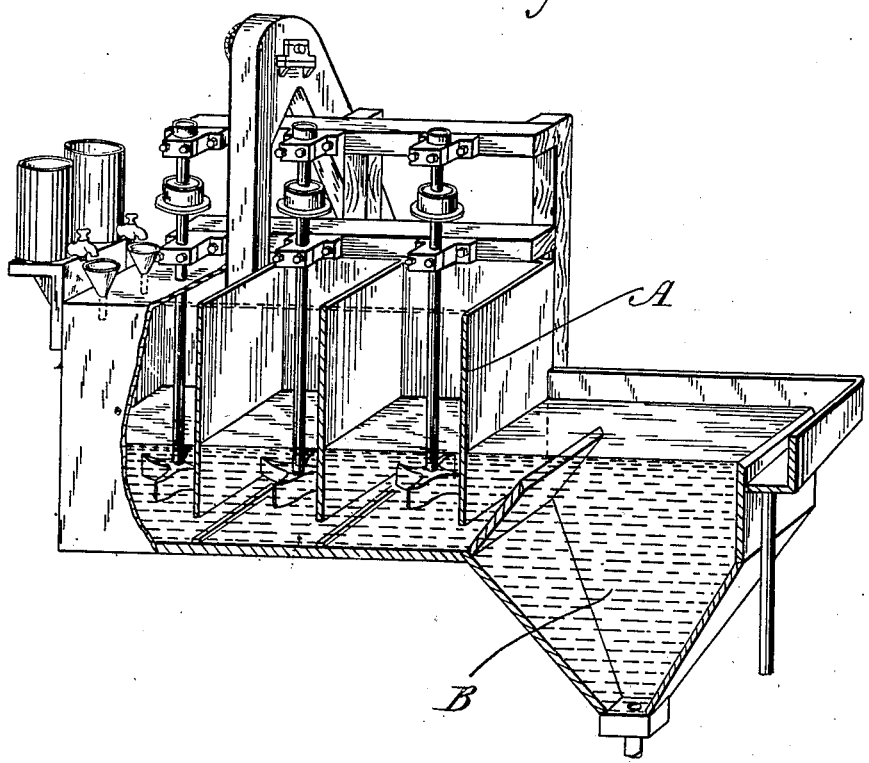

H. L. SULMAN.
CONCENTRATION OF ORES.
APPLICATION FILED NOV. 22, 1909.

955,012.

Patented Apr. 12, 1910.
2 SHEETS—SHEET 1.

H. L. SULMAN.
CONCENTRATION OF ORES.
APPLICATION FILED NOV. 22, 1909.
955,012.
Patented Apr. 12, 1910.
2 SHEETS—SHEET 2.
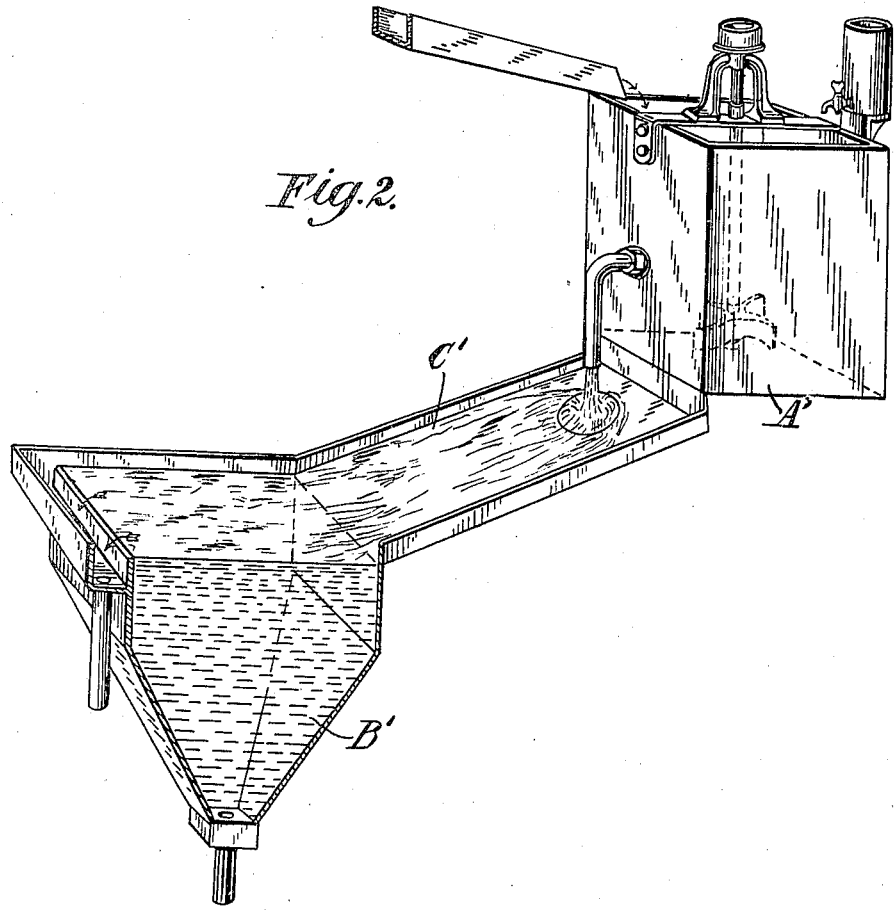

UNITED STATES PATENT OFFICE.

HENRY LIVINGSTONE SULMAN, OF LONDON, ENGLAND, ASSIGNOR TO MINERALS SEPARATION LIMITED, OF LONDON, ENGLAND.

CONCENTRATION OF ORES.

955,012.  Specification of Letters Patent.  Patented Apr. 12, 1910.

Application filed November 22, 1909. Serial No. 529,459.

*To all whom it may concern:*

Be it known that I, HENRY LIVINGSTONE SULMAN, a subject of the King of England, residing at London, England, have invented certain new and useful Improvements in the Concentration of Ores, of which the following is a specification.

This invention relates to the concentration of ores, the object being to separate certain constituents of an ore such as metallic sulfids, from other constituents such as gangue when the ore is mixed with or suspended in a liquid such as water.

According to this invention the crushed ore is introduced into water containing a very small percentage of certain alcohols, such as amyl-alcohol and containing also a small percentage of a suitable acid such as sulfuric acid, and the mixture is thoroughly agitated. The ore particles are caused to come into contact with a gas such as air; and the result is that metallic sulfid particles float and they can thereafter be separated by any well-known means.

In the accompanying drawings:—Figures 1 and 2 are diagrammatic views partly broken away in perspective illustrating two different forms of apparatus suitable for use in this process.

Referring to Fig. 1, the following is an example of one method of carrying this invention into effect:—Water containing a small percentage of sulfuric acid in solution, say from 0.2 to 0.5%, and containing in solution a small quantity say 0.01% or even less down to say 0.002% of amyl-alcohol is introduced with finely pulverized ore into an agitating apparatus A, in the proportion of say three or four parts by weight of water to one part by weight of ore. The agitation is carried out in such a way as thoroughly to disseminate air through the mixture which is thereafter discharged into a spitzkasten B. It is found that a coherent froth or scum floats on the surface of the water in the spitzkasten. This froth contains a large proportion of the metallic sulfids but is substantially free from gangue. Any well known means may be employed for collecting the froth. If desired the tailings can be retreated by the same process with or without the addition of fresh quantities of the organic materials referred to.

Referring to Fig. 2, an alternative method may be employed for causing the ore particles to come into contact with air. In this case the mixture of ore and water (containing the specified substances in solution), after thorough agitation in the vessel A' is discharged on to an inclined plane C' and thence on to the surface of the water in the spitzkasten B'. By such a method the ore particles in falling on to the inclined plane or in the course of their movement over it may become exposed to air whereupon the metallic sulfids will be further assisted to float off over the surface of the water in the spitzkasten. In the above processes the circuit water in the spitzkasten is usually just acid and generally contains less than 0.1% of acid. The action of the process above described may, in some instances, be improved by heating the mixture.

In mineral flotation processes hitherto known the substances used to secure the formation of a mineral-bearing froth or to effect or assist flotation have been oil or an oily liquid immiscible with water. According to this invention the mineral-frothing agent or agent which enables metallic sulfids to float under the conditions specified, consists of an alcohol such as amyl-alcohol contained in solution in the acidified water. Alcohols found suitable for use in this process are methyl-, propyl-, ethyl-, butyl-, or amyl-alcohol or mixtures of these. The proportion of the alcohol added is always a mere fraction of one per cent. of the water and in the case of amyl-alcohol we have found that the addition of 0.002% gives good results.

It is found desirable for the purpose of facilitating rapid deposition of gangue slimes to heat the circuit liquor.

What I claim as my invention and desire to secure by Letters Patent is:—

1. The herein-described process of concentrating ores which consists in mixing the powdered ore with slightly acidified water containing in solution a minute quantity of an alcohol, agitating the mixture, bringing the ore particles into contact with air so as to cause the metallic sulfids to float and separating the floating particles.

2. The herein-described process of concentrating ores which consists in mixing the powdered ore with slightly acidified water containing in solution a minute quantity of amyl-alcohol, agitating the mixture, bringing the ore particles into contact with air so as to cause the metallic sulfids to float and separating the floating particles.

3. The herein-described process of concentrating ores which consists in mixing the powdered ore with slightly acidified water containing in solution a minute quantity of amyl-alcohol mixed with other alcohols, agitating the mixture, bringing the ore particles into contact with air so as to cause the metallic sulfids to float and separating the floating particles.

4. The herein-described process of concentrating ores which consists in mixing the powdered ore with slightly acidified water containing in solution a minute quantity of an alcohol, agitating the mixture to form a froth and separating the froth.

5. The herein-described process of concentrating ores which consists in mixing the powdered ore with slightly acidified water containing in solution a minute quantity of amyl-alcohol, agitating the mixture to form a froth or scum and separating the froth.

6. The herein-described process of concentrating ores which consists in mixing the powdered ore with slightly acidified water containing in solution a minute quantity of amyl-alcohol mixed with other alcohols, agitating the mixture to form a froth or scum and separating the froth.

In testimony whereof I have signed my name to this specification in the presence of two subscribing witnesses.

HENRY LIVINGSTONE SULMAN.

Witnesses:
ALBERT OWEN WILLIAMS,
HAROLD CHARLES HAWKINS.